United States Patent [19]
Shimanuki

[11] Patent Number: 5,157,711
[45] Date of Patent: Oct. 20, 1992

[54] TELEPHONE TERMINAL DEVICE

[75] Inventor: Masanobu Shimanuki, Yokohama, Japan

[73] Assignee: Kabushiki Kaisha Toshiba, Kawasaki, Japan

[21] Appl. No.: 573,705

[22] Filed: Aug. 28, 1990

[30] Foreign Application Priority Data

Aug. 31, 1989 [JP] Japan ................. 1-225302

[51] Int. Cl.$^5$ ............... H04M 1/64; H04M 11/00; H04M 1/06; H04M 3/42
[52] U.S. Cl. ........................ 379/67; 379/88; 379/413; 379/211; 379/357
[58] Field of Search .............. 379/413, 67, 88, 89, 379/357, 211

[56] References Cited

U.S. PATENT DOCUMENTS

| | | | |
|---|---|---|---|
| 4,413,158 | 11/1983 | Danford | 379/211 |
| 4,647,787 | 3/1987 | Pommer, II | 379/413 |
| 4,682,169 | 7/1987 | Swanson | 379/104 |
| 4,794,638 | 12/1988 | Millett | 379/396 |
| 4,803,719 | 2/1989 | Ulrich | 379/413 |

FOREIGN PATENT DOCUMENTS

| | | | |
|---|---|---|---|
| 0065097 | 11/1982 | Australia | 379/41 |
| 0057854 | 8/1982 | European Pat. Off. | 379/88 |

Primary Examiner—James L. Dwyer
Assistant Examiner—Fan Tsang
Attorney, Agent, or Firm—Foley & Lardner

[57] ABSTRACT

A telephone terminal device in connection with an office line, comprises: (a) an office line acquisition unit for acquiring the office line; (b) an office line acquisition controller responsive to a call signal sent through the office line, for driving the office line acquisition unit by call signal power; and a power supply unit responsive to DC power supplied through the office line acquired by the office line acquisition unit, for supplying the supplied DC power to the telephone terminal device as device driving power. The telephone terminal device utilizes DC power supplied from a telephone exchange office through a telephone line so that built-in backup batteries are consumed at the lowest possible consumption rate.

3 Claims, 4 Drawing Sheets

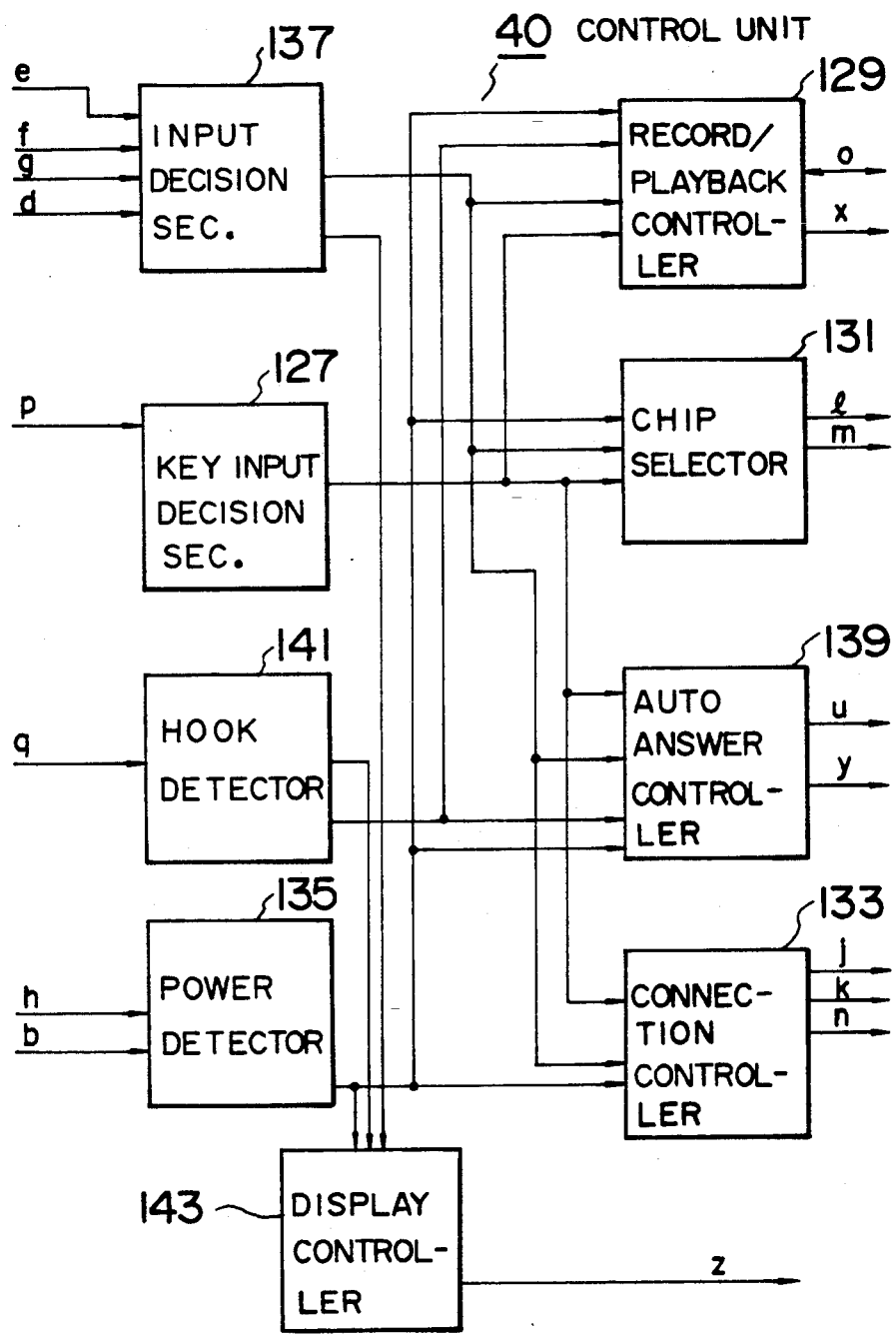
F I G. 4

TELEPHONE TERMINAL DEVICE

BACKGROUND OF THE INVENTION

The present invention relates generally to a telephone terminal device, and more specifically to an improvement in a power supply method therefor.

Certain telephone terminal devices such as an automatic telephone terminal answering device (referred to as terminal answering device, hereinafter) are provided with an automatic answering circuit and a message recording/playing back circuit, with which a telephone line (office line) can be acquired automatically in response to a call signal; an outgoing message (referred to as OGM) is played back; an incoming message from a caller (referred to as ICM) is recorded as a service to the telephone caller; and further an OGM is recorded or an ICM is played back in call waiting mode as a service to the telephone subscriber. In the telephone terminal device such as a terminal answering device provided with the automatic answering circuit and the message recording/playing back circuit, it has been conventional to supply power to these circuits from a commercial power source through an AC adapter.

In the conventional telephone terminal device so constructed as to receive power from a commercial power source, however, there exists a problem in that the device will not be operative during power failure or is unusable at a place where the commercial power source is not available. To overcome the above-mentioned problem, it may be possible to activate the automatic answering circuit and the message recording/playing back circuit by a built-in battery. In this case, however, there exists another problem in that the terminal device will not be operative after many hours of battery consumption.

SUMMARY OF THE INVENTION

With these problems in mind, therefore, it is the primary object of the present invention to provide a telephone terminal device which can minimize the power consumption of built-in batteries, by effectively utilizing power supplied through an office line to drive an automatic answering circuit and other circuits, so that the device can be serviceable for many hours without replacing the battery with a new one.

To achieve the above-mentioned object, the telephone terminal device available in connection with an office line according to the present invention comprises: (a) an office line acquisition unit for acquiring the office line; (b) an office line acquisition control unit responsive to a call signal sent through the office line, for driving the office line acquisition unit by the power from the call signal; and (c) a power supply responsive to DC power supplied through the office line acquired by the office line acquisition unit, for providing the supplied DC power to the telephone terminal device as device driving power.

BRIEF DESCRIPTION OF THE DRAWINGS

FIG. 4 is a block diagram for assistance in explaining the function of a control unit shown in FIG. 1.

DETAILED DESCRIPTION OF THE PREFERRED EMBODIMENTS

Figure 1:
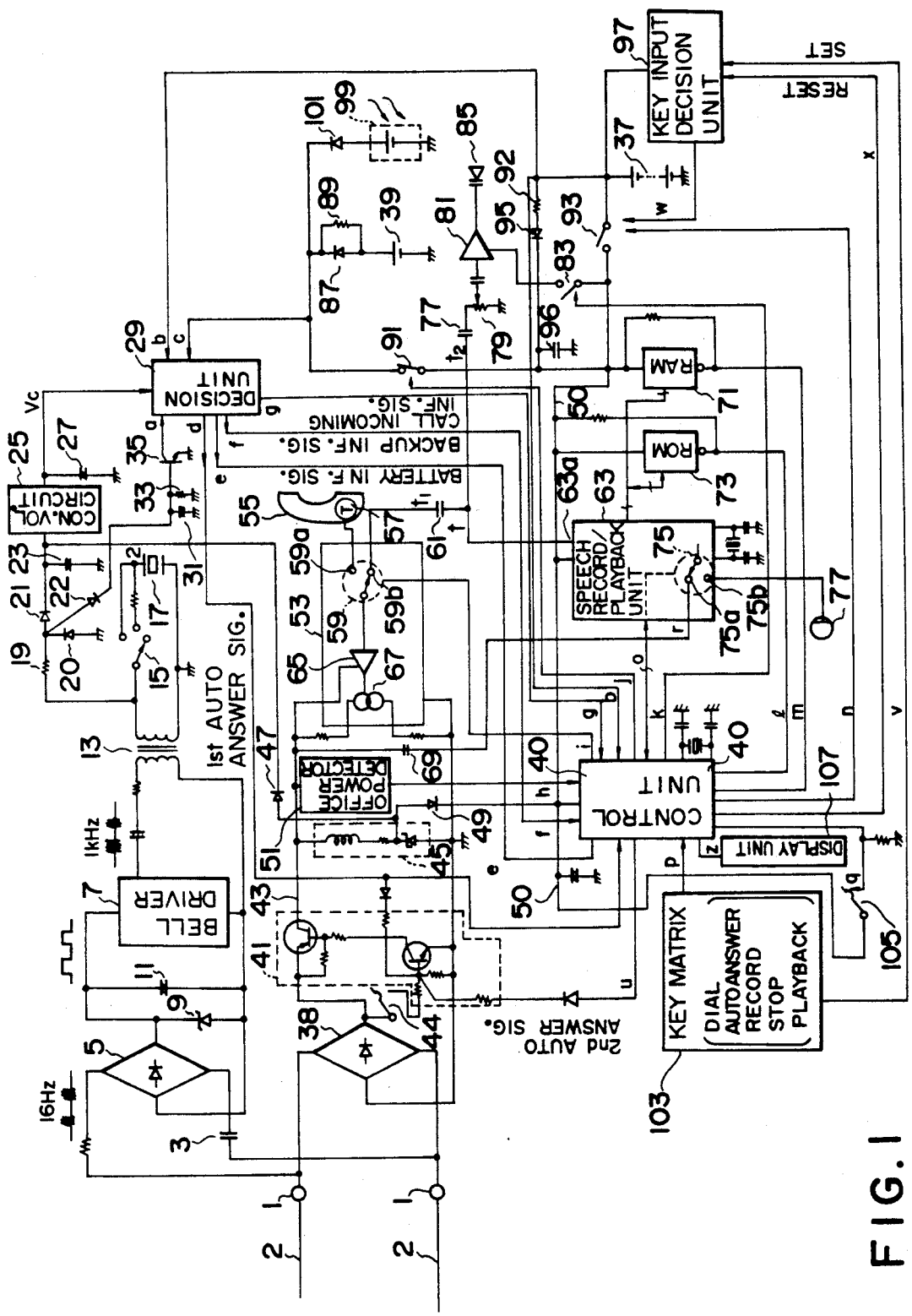
FIG. 1 is a block diagram showing an overall circuit configuration of one embodiment of the telephone terminal device according to the present invention.

FIG. 1 shows an overall circuit configuration of a preferred embodiment of the telephone terminal device according to the present invention, in which an automatic telephone terminal answering device is shown by way of example. In the drawing, the terminal answering device is connected to a telephone office line 2 via two terminals 1. The terminals 1 are connected to a bell driver 7 via a waveform shaper composed of a DC blocking capacitor 3, a rectifying bridge 5, a Zener diode 9 and a smoothing capacitor 11. A call signal (e.g. 16 Hz AC signal in Japan) transmitted through the office line is waveform shaped by the Zener diode 9 and the smoothing capacitor 11 and then inputted to the bell driver 7. In response to the call signal, the bell driver 7 generates a 1 KHz AC signal, for instance. This AC signal is applied to a primary winding of a transformer 13, and an output signal from a secondary winding of the transformer 13 is applied to a sounder 17 via a sound volume selecting switch 15 to actuate the sounder 17. On the other hand, the output signal from the transformer 13 is inputted to a rectifier composed of three diodes 20, 21 and 22 via a resistor 19. This rectifier outputs two rectified output voltages via the two diodes 21 and 22. The output voltage rectified through the diode 21 is applied to the capacitor 23 to charge it. The voltage charge on the capacitor 23 is applied to a constant voltage circuit 25 for voltage stabilization and then applied to the capacitor 27 to charge it. This capacitor 27 supplies driving power to a decision unit 29. On the other hand, the output voltage rectified through the diode 22 is smoothed by a smoothing circuit composed of a capacitor 31 and a resistor 33 and then applied to the base of the transistor 35, so that a low-level logic signal (referred to as a call incoming signal) is generated at the collector of the transistor 35 and inputted to the decision unit 29.

The decision unit 29 detects an arrival of a call signal and checks the battery voltage when activated by a call signal power charge on the capacitor 27. As described in further detail hereinafter, the decision unit 29 monitors a call incoming signal a, an output voltage b from an auxiliary battery 37, and an output voltage c from a secondary backup battery 39; and generates various signals including a first automatic answering signal d for commanding automatic answering in response to a call incoming signal, a call incoming information signal g indicative of a call incoming signal arrival, a backup information signal e indicative of whether memory backup is enabled or not, and a battery information signal f indicative of whether the auxiliary battery 37 is used up or not, according to the monitored conditions of the call incoming signal c and the output voltages b and o. The information signals of the decision unit 29 are applied to a control unit 40.

The terminals 1 are connected to an inner speech line 43 of the telephone device via a rectifying bridge 38 and an office line switching circuit 41. This office line switching circuit 41 is turned on to acquire an office line in response to an off-hook status (i.e. the hook switch 44 is turned on) or a first automatic answering signal a of the decision unit 29 or a second automatic answering signal u of the control unit 40.

The inner conversation line 43 is connected to a power supply circuit 45 which transforms DC power supplied from an office power source to a predetermined voltage, and applies the voltage to a constant voltage circuit 25 via a diode 47 and to a power supply line 50 via a diode 49. Various circuits of the terminal device are connected to this power supply line 50 to receive driving power.

The inner speech line 43 is also connected to an office power source detector 51 which monitors the voltage of an office power source to apply an office power source information signal h indicative of whether the voltage is normal (i.e. above a predetermined level) or not to the control unit 40.

The inner speech line 43 is further connected to a speech circuit 53 to which a hand set 55 is connected. Further, the speech circuit 53 is activated by the office power source supplied through the inner speech line 43. The hand set 55 includes a transmitter 57 and a receiver (not shown because not directly related to the present invention). The transmitter 57 is connected to one input terminal 59a of transmitter source selector switch 59 within the speech circuit 53. Further, a played back speech output terminal 63a of a speech record/playback unit 63 is connected to the other input terminal 59b of the selector switch 59 via a DC blocking capacitor 61. This selector switch 59 is changed over in response to a control signal from the control unit 40 to select any one of the speech signals from the transmitter 57 or the played back speech signal t of the speech record/playback unit 63. The selected signal is applied to a speech transmission main amplifier 65 which amplifies speech signals and transmits the amplified speech signals to an inner speech line 43 via a current source circuit 67.

The speech record/playback unit 63 is a circuit for recording and playing back an OGM and ICM, which is accessibly connected to a RAM 71 into or from which a message can be written or read freely and a ROM 73 in which a fixed OGM is previously stored. The speech record/playback unit 63 selects the record or playback mode; starts or stops the record and playback operations; designates memory addresses, etc. in response to control signals o from the control unit 40. Further, the speech record/playback unit 63 includes a recording source selecting switch 75. One input terminal 75a of the switch 75 is selectively connected to the inner speech line 43 via a DC blocking capacitor 69, and the other end of the input terminal 75b thereof is selectively connected to a microphone 77 in response to a control signal o. In a recording mode, speech signals selected through the selecting switch 75 are transformed into digital data and then written into the RAM 71. In a playback mode, digital data read out of the RAM 71 or the ROM 73 are transformed into analog speech signals and then outputted through the played back speech signal output terminal 63a.

Speech signals outputted from the speech record/playback unit 63 are inputted to the speech circuit 53 as explained already, and additionally to a speaker amplifier 81 via a DC blocking capacitor 77 and a sound volume adjusting variable resistor 79. Under these conditions, when a switch 83 is turned on by the control unit 40, since the speaker amplifier 81 receives power and therefore is activated, the speaker 85 sounds.

To the power supply line 50, an output voltage of the power supply circuit 45 is provided via the diode 49 as explained already, and additionally an output voltage of the secondary backup battery 39 is provided via a diode 87 when a switch 91 is turned on or an output voltage of the auxiliary battery 37 is provided when a switch 93 is turned on. Here, the switch 91 is controlled in response to a control signal j of the control unit 40, and the switch 93 is controlled in response to a control signal n of the control unit 40 and a control signal of a key input decision unit 97.

Output voltages of the power sources are so determined as to become a little lower in the order of the power supply circuit 45, the auxiliary battery 37 and the secondary backup battery 39. Therefore, when the circuit and the batteries are connected to the power supply line 50, the priority order of the power source is the power supply circuit 45 (i.e. office power source), the auxiliary battery 37 and the secondary backup battery 39. In other words, the office power source is used with priority when the office line is being acquired. However, upon a voltage drop of the office power source or in call waiting mode, the auxiliary battery 37 is used. Further, when the auxiliary battery 37 is used up, the secondary backup battery 39 is usable.

The auxiliary battery 37 has a sufficient battery capacity so that the record/playback unit 63 and the speaker amplifier 81 can be activated to record an OGM or playback an ICM in the call waiting mode. The secondary backup battery 39 is used to backup various memory units (e.g. RAM 71) within the telephone device, while being charged by a solar battery 99, via a diode 101 and a resistor 89, under light source. When the voltage of the auxiliary battery 37 drops during OGM recording or ICM playing back operation, this secondary backup battery 39 is disconnected from the power supply line via a switch 91 until the recording or playing back operation ends. Further, the auxiliary battery 37 is connected to the power supply line 50 via a resistor 92 and a diode 95 to backup the memory units when the secondary backup battery 39 is being disconnected from the power supply line 50. Further, a capacitor 96 having a large capacitance is connected to the power supply line 50.

A key matrix 103 is provided with various keys (referred to as answering function keys) for controlling various functions as a terminal answering device such as automatic answering mode setting, message recording, message playing back, etc. in addition to dial keys and various function keys provided for an ordinary telephone device. The key matrix 103 supplies an information signal p (referred to as key information), indicative of whether a key is depressed to the control unit 40. Further, when the ICM playback key or the OGM recording key is depressed, a set signal v is provided to a key input decision unit 97. This key input decision unit 97 is always kept activated directly by the auxiliary battery 37, and turns on the switch 93 in response to the set signal to connect the auxiliary battery 37 to the power supply line 50. In addition, this key input decision unit 97 turns off the switch 93 in response to a reset signal x from the control unit 40.

The control unit 40 is a microcomputer, in practice, for monitoring the status of various circuits arranged within the telephone device and controlling the operations thereof, as explained already. In addition to the above-mentioned functions, the control unit 40 outputs chip select signals l and m for enabling the ROM 73 and RAM 71 respectively when a message is recorded or played back, and activates a display unit 107 to display necessary information. The function of this control unit 40 will be described in further detail later.

Figure 2:
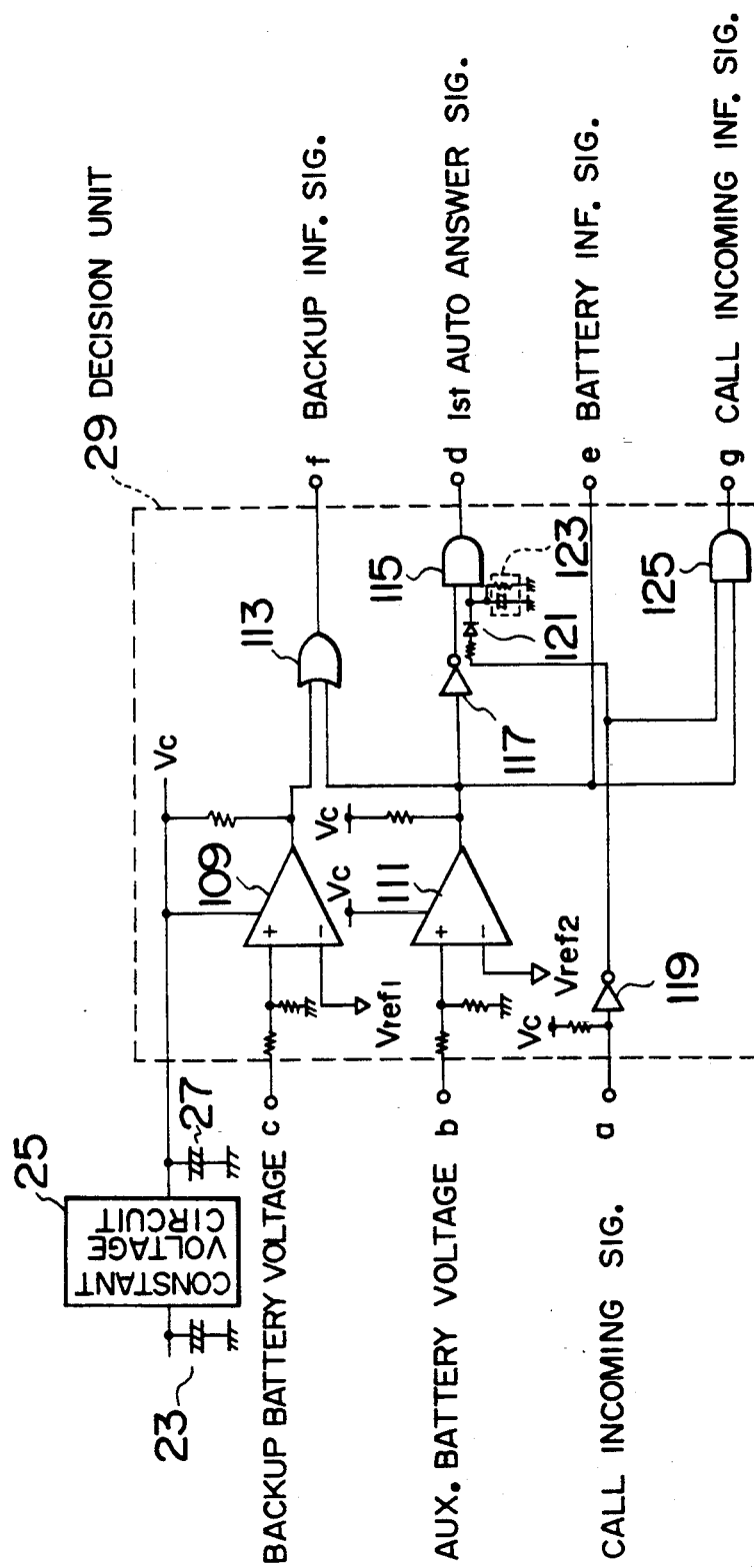
FIG. 2 is a circuit diagram showing a decision unit shown in FIG. 1.
Figure 3:
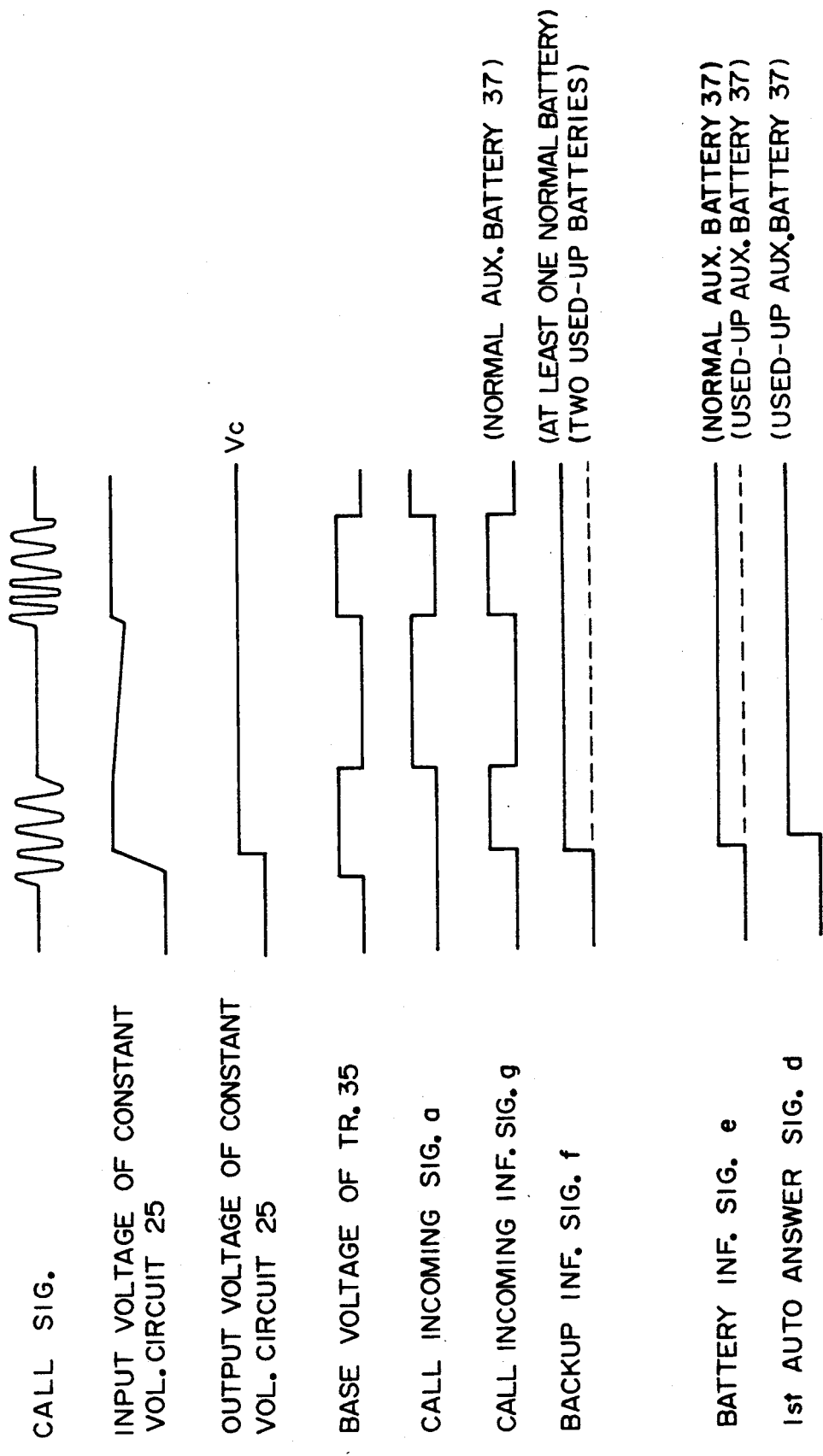
FIG. 3 is a signal waveform timing chart for assistance in explaining the operation of the decision unit shown in FIG. 2.

FIG. 2 shows a circuit configuration of the decision unit 29 and FIG. 3 shows voltage waveforms at various points thereof. As described before, this decision unit 29 is activated by power supplied from the constant voltage circuit 25. As shown in FIG. 3, when a call signal comes through the office line 2, this call signal is transformed into a pulsating DC voltage as shown and then inputted to the constant voltage circuit 25 to obtain a stabilized constant voltage Vc supplied to the decision unit 29. Therefore, the decision unit 29 is operated by the call signal power from a call signal which comes to the system when the office line is acquired.

The decision unit 29 includes two comparators 109 and 111. The first comparator 109 compares the secondary backup battery voltage o with a first reference voltage $V_{ref1}$ and outputs a high-level signal when the former exceeds the latter. The second comparator 111 compares the auxiliary battery voltage c with a second reference voltage $V_{ref2}$ and outputs a high-level signal when the former exceeds the latter. Further, these two reference voltages $V_{ref1}$ and $V_{ref2}$ are generated on the basis of a voltage Vc applied by the constant voltage circuit 25 through two circuits (both not shown). The two output signals of the comparators 109 and 111 are inputted to an OR gate 113 to form a backup information signal b. Therefore, as shown in FIG. 3, the backup information signal is at a high level when either one of the secondary backup battery voltage or the auxiliary battery voltage exceeds the reference voltage $V_{ref}$ (i.e. if at least one of the batteries is not used up and therefore the voltage thereof is normally high), but at a low level when both are used up. In response to the backup information signal f, the control unit 40 checks the backup capability of the battery 37 or 39.

Further, the output signal of the second comparator 111 is inverted by an inverter 117 and inputted to an AND gate 115. Further, a call incoming signal a (changed to a low level in synchronism with the call signal arrival as shown in FIG. 3) is inverted to a high level by an inverter 119. This inverted high-level signal is provided to an integrator 123 via a reverse-current prevention diode 121. An output voltage of this integrator 123 (changed to a high level when a call signal is being received repeatedly) is inputted to an AND gate 115. Therefore, when a call signal arrives under a condition when the auxiliary battery 37 is used up, the output signal of the AND gate 115 changes to a high level as a first automatic answering signal d.

Further, an output signal of the second comparator 111 is provided to the control unit 40 as a battery information signal e. Therefore, as shown in FIG. 3, the battery information signal e is at a high level if the auxiliary battery 37 is normal but at a low level if used up.

Further, an output signal of the second comparator 111 and an inversion signal of a call signal a are inputted to the AND gate 125 to form a call incoming signal g. Therefore, the AND gate 125 outputs a high-level call incoming signal g in synchronism with the call signal arrival, when a call signal arrives under a condition when the auxiliary battery 37 is normal, as shown in FIG. 3.

FIG. 4 shows various functions of the control unit 40 for controlling various operations of various units arranged within the telephone terminal device. Each function shown by each block can be realized in practice in accordance with software. The operation of the telephone terminal device will be described hereinbelow together with the description of various functions of the control unit 40.

Call Waiting Mode

In this mode, since power is not supplied from the office power source, the decision unit 29 and the speech circuit 53 are both inoperative. Under these conditions, since the switches 83, 91 and 95 are deenergized, the switch 83 is off; the switch 91 is on; and the switch 93 is off. Therefore, the secondary backup battery 39 is connected to the power supply line 50 via the diode 87 to backup the RAM 71 and the control unit 40. Further, the auxiliary battery 37 is also connected to the power supply line 50 via the resistor 92 and the diode 95 for backup, in cooperation with the secondary backup battery 39.

Under these conditions, when the ICM playback key or the OGM record key is depressed in the key matrix 103, since the key matrix 103 outputs a set signal u to the key decision unit 97, the switch 93 is turned on to directly connect the auxiliary battery 37 to the power supply line 50. In this case, since there exists a difference in voltage between the auxiliary battery 37 and the secondary backup battery 39, as already explained, power is supplied from the auxiliary battery 37 to the power supply line 50, without supplying power from the secondary backup battery 39.

At the same time, the key matrix 103 applies a key input information signal p to the control unit 40. In response to this signal p, a key input discriminator 127 of the control unit 40, as shown in FIG. 4, determines the presence of the key input information signal and provides the corresponding information signals to a record/playback controller 129 and a chip selector 131. In response to these information signals, the chip selector 131 enables the RAM 71, and the record/playback controller 129 commands the speech record/playback unit 63 to record an OGM or playback an ICM. Further, in the case of an OGM recording operation, since the same information signal is provided from the key input discriminator 127 to a connection controller 133, the switch 83 is closed to allow the speaker amplifier to be operative. As described above, power supplied from the auxiliary battery 37 activates the control unit 40 and the speech record/playback unit 63 for ICM playing back and OGM recording operation.

In case the voltage b of the auxiliary battery 37 drops during the ICM playing back or the OGM recording operation and therefore the secondary backup battery 39 starts to supply power, a power detector 135 shown in FIG. 4 detects this situation and outputs a detection signal. In response to this detection signal, the connection controller 133 opens the switch 91, thus it is possible to prevent the secondary backup battery 39 from being used for the ICM playing back or OGM recording operation whose power consumption rate is relatively large.

Upon completion of the ICM playing back or OGM recording operation, a control signal o indicative of this completion is provided from the speech record/playback unit 63 to the control unit 40. In response to the control signal o, the record/playback controller 129 of the control unit 40 sends a reset signal x to the key input decision unit 97 and, further a corresponding information signal to the connection controller 133. Then, the key input decision unit 97 turns off the switch 95 to disconnect the auxiliary battery 37 from the power supply line 50. Further, if the switch 91 is kept off, the connection controller 133 returns this switch 91 to an on position so that the telephone terminal device is returned to the original conditions.

Power supply operation in the call incoming mode and conversation mode will be described hereinbelow on the assumption that the device is set to the automatic answering mode. This is because power supply operation in the ordinary telephone mode is substantially the same as in the automatic answering mode, except that the office line is acquired when the hand set is lifted up into an off-hook status in call incoming mode.

In Call Incoming Mode

Upon a call incoming from the office line 2, the decision unit 29 starts to operate by call signal power to monitor the conditions of the auxiliary battery 37 and the secondary backup battery conditions. The operation will be explained hereinbelow by classifying it into a few cases according to battery conditions.

(1) In normal auxiliary battery

In this case, the decision unit 29 outputs a high-level battery information signal e, a high-level backup information signal and a call incoming information signal g synchronized with a call signal to the control unit 40. Under these conditions, the control unit 40 operates by power supplied by the secondary backup battery 39. The input decision section 137 of the control unit 40 checks battery conditions in response to these information signals e, f and g, and sends information signals indicative of the checked battery conditions to the automatic answering controller 139, the record/playback controller 129, the chip selector 131 and the connection controller 133, after the number of inputted call-incoming information signals (i.e. the number of calls) has reached a predetermined number. Then, the automatic answering controller 139 outputs a second answering signal to turn on the office line switch circuit 41 to acquire the office line, so that power of the office power source is supplied through the power supply circuit 45 to the power supply line 50, the decision unit 29 and the speech circuit 53. Therefore, the telephone terminal device operates by power supplied from the office power source.

Upon office line acquisition, the office power detector 51 detects the office power voltage, and outputs a high-level office power information signal to the control unit 40 if the detected voltage is normal and beyond a predetermined value. In response to this high-level office power information signal h, the power detector 135 of the control unit 40 sends a corresponding signal to the record/playback controller 129, the chip selector 131, the automatic answering controller 139 and the connection controller 133, so that the controllers 129 and 139 and the selector 131 operate according to the normal office power voltage. That is, the record/playback controller 129 commands the speech record/playback unit 63 to start the playback operation, the chip selector 131 to enable the RAM 71, and the automatic answering controller 139 to changeover the selector switch 59 to a terminal 59b. Therefore, an OGM previously recorded in the RAM 71 is played back and sent through the office line 2. Under these conditions, in case the office power voltage drops for some reason or other, since the office power information signal h changes to a low level, the power detector 135 detects this low-level signal and sends a signal indicative thereof to the connection controller 133, so that the connection controller 133 turns on the switch 93 to connect the auxiliary battery 37 to the power supply line 50. Therefore, it is possible to backup a drop in the office power voltage by the auxiliary battery 37.

(2) In used-up auxiliary battery

In this case, the decision unit 29 outputs the first automatic answering signal d instead of the call incoming information signal g. The first automatic answering signal d is provided to the office line switch circuit 41 to turn on the circuit 41, and further to the control unit 40 to supply driving power to the unit 40 In other words, the office line switch circuit 41 is driven by the call signal power to acquire the office line 2.

Upon office line acquisition, a call signal stops incoming and driving power is supplied from the office power source to the control unit 40 via the power supply circuit 45 and the diode 49. (However, if the secondary backup battery 39 is normal, driving power is also supplied from the secondary backup battery 39 to the control unit 40).

Further, in this case, the battery information signal e is at a low level, and the backup information signal f is at a high level when the secondary backup battery 39 is normal but at a low level when it is abnormal (used up). In response to the first automatic answering signal d, the battery information signal e and the backup information signal ;, the control unit 40 determines battery conditions and sends information corresponding thereto to the record/playback controller 129, the chip selector 131, the automatic answering controller 139 and the connection controller 133. Then, the automatic answering controller 139 outputs the second automatic answering signal to maintain the office line acquisition after the first automatic answering signal d has stopped (the signal stops because a call signal arrival stops due to office line acquisition). Consequently, when the power supply detector 135 outputs an information signal indicative of office line acquisition, the controllers 129, 139 and 133 and the selector 131 operate according to the battery conditions, that is, according to whether the secondary backup battery 39 is normal or not as follows:

(2)-1 In normal secondary backup battery 39

In this case, in the same way as in (1) (when the auxiliary battery 37 is normal) basically, an OGM stored within the RAM 71 is played back and sent out through the office line 2. However, even if the office supply voltage drops, the switch 93 is kept turned off, so that the used-up auxiliary battery 37 is kept disconnected from the power supply line 50 (this disconnection of the used-up auxiliary battery 37 is the same as in the following case (2)-2).

(2)-2 In used-up secondary backup battery 39

In this case, the ROM 73 is enabled instead of the RAM 71 and an OGM is played back. Therefore, a fixed OGM stored in the ROM 73 is played back and sent out through the office line 2. The reason why the fixed OGM is played back is that data within the RAM 71 are volatile because the auxiliary battery 37 and the secondary backup battery 39 are both used up. The fixed OGM is such a message that an automatic answering service is not available because batteries have been used up. Upon completion of a fixed OGM playback, the control unit 40 stops outputting the second automatic answering signal u to turn off the office line switch circuit 41, so that the conversation is completed and the telephone device is returned to the call waiting mode. As described above, the reason why the conversation is completed without recording an ICM after a fixed OGM has been sent is that it is impossible to store an ICM in the ROM 71 because the batteries are both used up.

Conversation mode

Where at least one of the auxiliary battery 37 and the secondary backup battery 39 is normal in the call signal incoming mode (in the case as in (1) or (2)-1), after an OGM has been sent out, the conversation mode is maintained to record the succeeding ICM. In more detail, upon completion of OGM playback, the control unit 40 commands the speech record/playback unit 63 to record an ICM. Then, the speech record/playback unit 63 changes over the selector switch 75 to the terminal (75i a) side to record speech signals (i.e. ICM) sent through the office line. The operations in the conversation mode are all performed by power supplied from the office power source. In case the voltage of the office power source drops for some reason or other, the switch 93 is turned on to supply power from the auxiliary battery 37 in turn (however, when the auxiliary battery 37 is also used up, the switch 95 is not turned on and therefore no power is supplied from the auxiliary battery 37). Further, when the voltage of the office power source drops, the control unit 40 turns off the switch 91, in response to a low-level office power information signal to disconnect the secondary backup battery 39 from the power supply line 50 for protection of the battery 39 from consumption.

Upon completion of ICM recording, the control unit 40 stops outputting the second automatic answering signal u for maintaining the office line acquisition to complete the conversation mode and returns to the call waiting mode.

By the way, in addition to the above-mentioned device configuration of the embodiment, it is also possible to add such a circuit that a remote control information signal (e.g. a series of MF signals) sent through the office line can be received and decoded to command the speech record/playback unit 63 to operate in accordance with the decoded information. In this case, it is possible to record an OGM or playback an ICM in response to remote control signals from an external telephone, in addition to the ordinary automatic answering service such that an OGM can be played back and an ICM can be recorded after the office line has been acquired.

In the above-mentioned case, the power supply operation in the conversation mode is the same as in the afore-mentioned automatic answering service mode. That is, the office power source is mainly used. However, when the office power source voltage drops, the auxiliary battery 37 (if normal) is used as a subsidiary and the secondary backup battery 39 is not used.

As described above, the operation has been explained by classifying it into a call waiting mode, a call incoming mode and a conversation mode. In all the modes, a display controller 143 of the control unit 40 receives various information signals from the input decision section 137, the key input decision section 127, the hook detector 141 and the power detector 135 to display necessary information (e.g. battery conditions, call waiting mode, call incoming mode, conversation mode, etc.) according to the operation on a display unit 107.

In the above embodiment, the present invention is applied to a terminal answering device by way of example. Without being limited thereto, however, it is also possible to apply the present invention to various terminal devices, in particular to facsimile devices. This is because the facsimile device is provided with a RAM for storing document contents, a printer for printing received data, etc. and therefore it is necessary to provide a power source for backing up the RAM or driving the printer.

What is claimed is:

1. A telephone terminal device having a battery power supply and adapted for connection with an office line, comprising:
   (a) battery power checking means, responsive to a call signal sent through said office line, for checking a power supply capability of said battery power supply by using power of said signal;
   (b) office line acquisition means for acquiring said office line;
   (c) first office line acquisition control means responsive to said call signal, for driving said office line acquisition means by said power of said call signal, when said battery power checking means determines that said power supply capability of said battery power supply is insufficient;
   (d) second office line acquisition control means responsive to said call signal, for driving said office line acquisition means by power supplied from said battery power supply, when said battery power checking means determines that said power supply capability of said battery power supply is sufficient; and
   (e) power supply means for receiving power supplied through said office line acquired by said office line acquisition means and for supplying received power to said telephone terminal device as device driving power.

2. The telephone terminal device of claim 1, further comprising:
   (a) detection means for detecting a drop in power supplied through said office line; and
   (b) switching means, responsive to a detection signal from said detection means, for starting to supply power from said battery power supply to said telephone terminal device.

3. A terminal answering device adapted for connection with an office line, comprising:
   (a) office line acquisition means responsive to a call signal sent through said office line, for acquiring said office line;
   (b) volatile memory means for recording a free outgoing message;
   (c) non-volatile memory means for previously storing a fixed outgoing message;
   (d) backup power supply means for backing up said volatile memory means;
   (e) message playing back means driven after said office line has been acquired, for reading out one message of said free and fixed outgoing messages from one of said volatile and non-volatile memory means to send said one message through said office line;
   (f) backup power checking means, for checking a power supply capability of said backup power supply means; and (g) message control means, responsive to a checked result from said backup power checking means, for controlling said message playing back means to read out said free outgoing message stored in said volatile memory when said checked result indicates a sufficient power supply capability of said backup power supply means, and to read out said fixed outgoing message stored in said non-volatile memory when said checked result indicates an insufficient power supply capability of said backup power supply means.

* * * * *